Sept. 3, 1935.    J. L. WOODBRIDGE    2,013,618
STORAGE BATTERY CHARGING SYSTEM
Filed Aug. 18, 1934
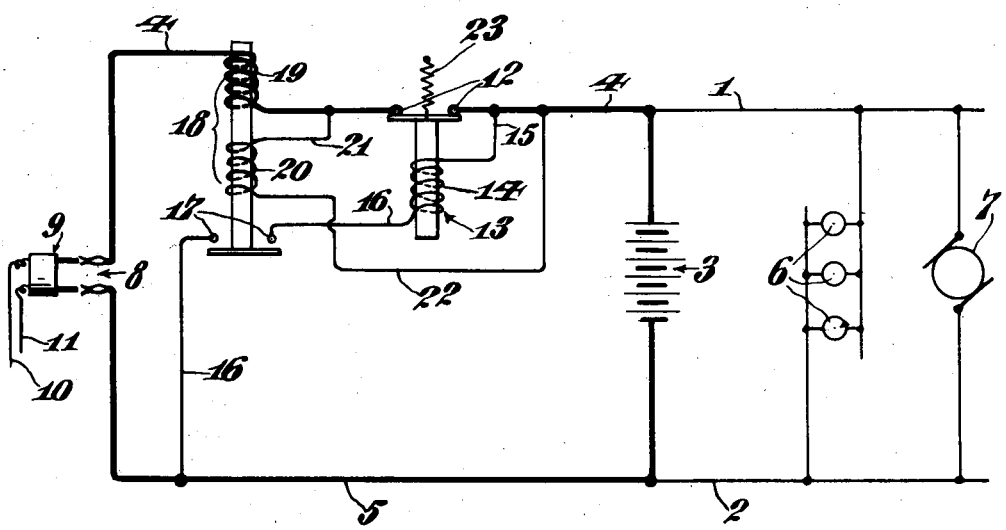
INVENTOR.
Joseph Lester Woodbridge,
BY
Augustus R. Stoughton.
ATTORNEY.

Patented Sept. 3, 1935

2,013,618

UNITED STATES PATENT OFFICE 2,013,618

STORAGE BATTERY CHARGING SYSTEM

Joseph Lester Woodbridge, Philadelphia, Pa., assignor to The Electric Storage Battery Company, Philadelphia, Pa., a corporation of New Jersey Application August 18, 1934, Serial No. 740,413

3 Claims. (Cl. 171—314)

The invention relates to systems for controlling the charge of a storage battery and is more particularly applicable to systems in which it is desired to cut off the charging current when a certain battery voltage has been reached but to reconnect the battery to the charging source if it should subsequently be subjected to a further discharge. The system is of particular advantage in controlling the charge of a train-lighting storage battery at the terminal station and especially a battery which is in air conditioning service and may be called upon to carry the load of the air conditioning apparatus while the car is standing at the station just previous to its departure. Under such conditions, if the battery requires a preliminary charge, it is customary to connect it to a source of charging current at the terminal station by means of a charging plug inserted in a suitable charging receptacle mounted on the car and connected to the battery. In order to avoid the possibility of prolonged overcharge under these conditions, it is desirable to provide an automatic switch which will open the charging circuit when the battery voltage rises to a point corresponding to the approach to the fully charged condition. Such an automatic switch can be controlled by a coil connected across the battery circuit and so designed that, at a certain battery voltage applied to the coil, the circuit will be opened but if the voltage of the battery drops to a point corresponding to a discharging condition, the charging circuit will again be closed and additional current be supplied to the battery and its load. In such a device, it is important that the coil, which is connected across the battery to operate the automatic switch, shall be automatically disconnected from the battery except when the charging circuit is connected to the car, to avoid a continuous drain from the battery when the car is out of use.

In order to accomplish these various objects, I have devised the scheme shown in the accompanying diagram, in which 3 indicates the battery connected to the load circuit 1—2 to which the lamps 6 and the motor 7 may be connected. The battery is connected by means of conductors 4 and 5 to the charging receptacle 8 which is adapted to receive the charging plug 9 connected by conductors 10 and 11 to any suitable source of charging current (not shown).

In the circuit of conductor 4 are interposed the contacts 12 of contactor 13 whose exciting coil 14 is connected across the battery by conductors 15 and 16. In the circuit of conductor 16 are interposed the contacts 17 of a relay 18 provided with two exciting coils 19 and 20. Coil 19 which consists of a few, comparatively heavy turns, is connected in series with the charging circuit 4, while coil 20, which consists of a comparatively large number of fine wire turns, is connected by conductors 21 and 22 across the contacts 12 of contactor 13. The contacts 12 are normally held closed by the spring 23.

The operation of this apparatus is as follows:

When the charging circuit is disconnected at the charging plug 9, there will be no current flowing in either coil 19 or coil 20 of the relay 18 and this relay will be in the open position shown in the diagram and no current will flow through the coil 14 of contactor 13 and the contacts at 12 will remain closed. When it is desired to charge the battery 3, the charging plug 9 will be inserted in the receptacle 8 and, by reason of the voltage maintained on the charging circuit 10—11 which will normally be higher than that of the battery, charging current will flow into the battery, passing through coil 19 and across the contacts 12. This current in the coil 19 will close the contacts 17 of the relay 18, thus connecting coil 14 of the contactor 13 across the battery. Until, however, the voltage of the battery reaches a certain predetermined point corresponding to a condition of nearly full charge, the current in coil 14 will not be sufficient to open the contacts 12. When, however, this predetermined battery voltage is reached, the effect of the current in coil 14 will be sufficient to open the contacts 12 and interrupt the charging current. This will interrupt the current in the coil 19 of relay 18 and, were it not for the excitation of coil 20, the contacts at 17 would be opened, causing the contactor 13 again to close the contacts 12, reestablishing the charging current in coil 19, thus producing a continuously repeated opening and closing of the two switches. However, as stated above, the current in coil 20, when the contacts at 12 have been opened, due to the fact that the voltage of the charging source is always higher than the voltage of the battery, will hold the contacts 17 of relay 18 closed, maintaining the exciting current in coil 14 of contactor 13.

If now the load due to the lamps 6 and the motor 7 is thrown on the battery, its voltage will drop until a point is reached where the excitation of coil 14 will be insufficient to keep the contacts at 12 open and the latter will be closed, thus restoring the charging current to the battery.

When the charging plug 9 is removed from the receptacle 8, there will be no exciting current in either coil 19 or coil 20 of relay 18 and the contacts at 17 will be opened, thus cutting off the drain of current from the battery through coil 14.

I do not intend to be limited save as the scope of the prior art and of the attached claims may require.

I claim:

1. In combination, a storage battery and its load circuit, a charging circuit for the battery, a contactor having contacts interposed in the charging circuit, means including a coil responsive to the battery voltage for opening said contacts, and a relay having contacts for opening and closing the circuit of said coil, said relay provided with two exciting coils whereof one is connected in series with the charging circuit and the other is connected across the contacts of the contactor.

2. In combination, a storage battery, a load circuit for said storage battery, a charging circuit for said storage battery, a source of electricity in said charging circuit, a normally closed contactor controlling said charging circuit, a coil for said contactor connected across said charging circuit, a switch controlling the connection of said coil across said charging circuit, a second coil connected in said charging circuit in series with the contacts of said contactor and stressing said switch to closed position when said second coil is energized, and a third coil connected in said charging circuit in parallel with the contacts of said contactor and stressing said switch to closed position when said third coil is energized.

3. In combination, a storage battery, a load circuit for said storage battery, a charging circuit for said storage battery, a source of electricity in said charging circuit, a normally closed contactor controlling said charging circuit, a coil for said contactor connected across said charging circuit, a switch controlling the connection of said coil across said charging circuit, a second coil consisting of a few turns of heavy wire connected in said charging circuit in series with the contacts of said contactor and stressing said switch to closed position when said second coil is energized, and a third coil consisting of a number of turns of fine wire connected in said charging circuit in parallel with the contacts of said contactor and stressing said switch to closed position when said third coil is energized.

JOSEPH LESTER WOODBRIDGE.